Aug. 19, 1930.                T. BOSSARD                 1,773,166
                    AIR BRAKE FOR AUTOMOTIVE VEHICLES
                          Filed Feb. 5, 1927
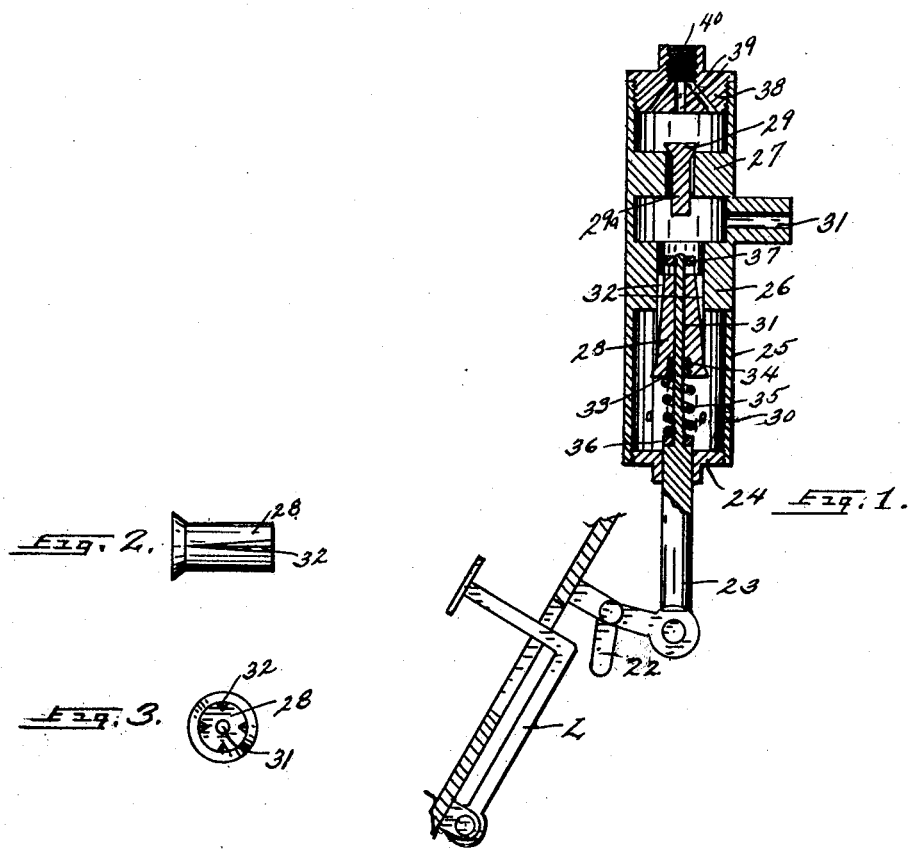
Inventor
Theodore Bossard
By R. M. Thomas.
Attorney Patented Aug. 19, 1930

1,773,166

UNITED STATES PATENT OFFICE

THEODORE BOSSARD, OF SALT LAKE CITY, UTAH, ASSIGNOR TO AMERICAN AIR-BRAKE COMPANY, OF SALT LAKE CITY, UTAH, A CORPORATION OF UTAH

AIR BRAKE FOR AUTOMOTIVE VEHICLES

Application filed February 5, 1927. Serial No. 166,071.

My invention relates to automotive vehicles and has for its object to provide a new and efficient air brake valve, for controlling the flow of air to the brake operating mechanism of the wheels.

A still further object is to provide an economical installation of an air brake for automobiles or other road vehicles in which quick stopping and positive brake action are one of the essentials of safety.

These objects I accomplish with the device illustrated in the accompanying drawings in which similar numerals and letters of reference indicate like parts throughout the several views and as described in the specification forming a part of this application and pointed out in the appended claim.

In the drawings in which I have shown the best and most preferred manner of building my invention Figure 1 is a section of the control valve, with the levers which operate it shown in elevation. Figure 2 is a side view of the valve unit used in the control valve, and Figure 3 is an end view of the same.

The control valve V is operated by the movement of the lever L which movement places the top of the lever L against a suitably mounted bell crank lever 22 moving it outwardly. The other end of the said bell crank lever is pivoted to a plunger rod 23 which operates through a closure cap 24 in the valve V. The said valve V is composed of a casing 25 having partially closed segments 26 and 27 therein in which the valves 28 and 29 of the control valve operate and which closures form the seats for said valves. Holes 30 are provided in the casing 25 in the lower portion thereof to allow free passage of air therefrom. An air line connection 31 is provided in the side of the casing 25 between the two segments 26 and 27. The control valve 28 is made as shown in Figures 2 and 3 with tapered grooves 32 along the sides thereof and a central hole 31 bored therethrough, in which the small end of the plunger rod 23 operates. A packing nut 33 is provided to screw into the end of the slide valve 28 with suitable packing 34 therebetween to prevent leakage from around the rod 23. One end of the rod 23 is smaller in diameter than the rest of the rod and carries a spring 35 thereon. The said spring 35 has one end pressing on the valve 28 and the other end pressing on an adjustment nut 36. The said nut 36 is screwed onto the rod 23 to allow adjustment of the tension of the spring 35 when necessary. The free end of the said rod 23 has another nut 37 screwed thereon to hold the valve from coming off from the rod and to partially control the action in the seat 26. The said valve 29 is of the common tappet valve type having a valve stem 29ª to hold it in place in its seat and the valve is operated by the pressure of the air or by the movement of the rod 23 to such an extent that the nut 37 will operate the stem of the valve 29 opening the valve in its seat allowing passage of air therethrough. A closure cap 38 is secured in the top end of the valve V, with an air passage 39 formed therethrough and with internal threads 40 therein to connect an air line thereto.

The operation of my device is as follows:—

To operate the brakes on the vehicle the foot lever is pressed downward by the driver of the vehicle; and as the foot lever is pressed the lever 22 is moved, actuating the rod 23, closing the valve 28 and directing the air through the valve 27 and out through the ports 39 to the mechanism to be operated. The air travels through the control valve V to the brakes through the brake lines in proportion to the amount of air allowed to escape through the valve 28 and the holes 30. The tapered slots 32 in the sides of the valve 28 close accordingly with the amount that the said valve is moved longitudinally thus they may be closed a small way or they may be full opened depending upon the amount that the foot brake lever L is pressed downward.

The air pressure passing through the control valve V will open the valve 29 and pass out through the holes 39 to the brake.

When air enters the control valve V through the connection 31 and is not all used in braking the wheels the balance or excess air passes out through the holes 32 in the valve 28 and into the open air through the holes 30 in the casing of the valve.

When a drastic action of the brakes is required the lever L is pressed downward to its full extent and the control valve 38 closes the valve holes 3 and all of the air is directed to the brakes.

Having thus described my invention I desire to secure by Letters Patent and claim:

A control valve to control the amount of air allowed to enter a braking system consisting of a cylindrical casing having valve seats formed therein, a plunger rod longitudinally movable in a cap over one end of said casing; a control valve unit on said plunger rod adapted to close one of said seats; tapered slots in the edges of said valve unit adapted to open and close by the movement of said plunger rod; another valve operable in the other of said seats and actuated by air pressure, or the end of said plunger rod; air holes in the wall of said casing to allow excess air to pass therefrom; and means to supply air to said valve.

In testimony whereof I have affixed my signature.

THEODORE BOSSARD.